United States Patent [19]
Hoekstra et al.

[11] Patent Number: 5,526,939
[45] Date of Patent: Jun. 18, 1996

[54] METHOD OF CHECKING THE COMPOSITION OF MULTILAYER UNITS COMPOSED OF SHEETLIKE PARTS AND APPARATUS FOR COMPOSING, AND CHECKING THE COMPOSITION OF, SUCH UNITS

[75] Inventors: Ydo N. Hoekstra, Joure; Klaas Drenth, Ureterp, both of Netherlands

[73] Assignee: Hadewe B.V., Drachten, Netherlands

[21] Appl. No.: 112,538

[22] Filed: Aug. 27, 1993

Related U.S. Application Data

[62] Division of Ser. No. 849,828, Mar. 11, 1992, Pat. No. 5,265,733, which is a continuation of Ser. No. 482,851, Nov. 22, 1990, abandoned.

[30] Foreign Application Priority Data

Feb. 22, 1989 [NL] Netherlands ............................ 8900437

[51] Int. Cl.$^6$ .................................. B07C 5/12; B65H 7/12
[52] U.S. Cl. ........................... 209/603; 209/567; 209/604; 271/263
[58] Field of Search ........................... 209/3.2, 534, 552, 209/567, 598, 599, 601, 603, 604, 900; 271/9, 262, 263; 73/159, 779, 865.8; 33/DIG. 13

[56] References Cited

U.S. PATENT DOCUMENTS

| | | | |
|---|---|---|---|
| 2,891,667 | 6/1959 | Truver | 209/603 X |
| 3,930,582 | 1/1976 | Gartner et al. | 209/601 X |
| 3,935,429 | 1/1976 | Branecky et al. | 209/400 X |
| 4,068,385 | 1/1978 | Mitzel | 209/534 X |
| 4,170,346 | 10/1979 | Murray et al. | 270/54 |
| 4,354,865 | 10/1982 | Poad et al. | 209/3.2 X |
| 4,378,109 | 3/1983 | Takahashi et al. | 271/263 |
| 4,426,785 | 1/1984 | Loftus et al. | 33/147 |
| 4,462,587 | 7/1984 | Graef et al. | 209/603 X |
| 4,623,975 | 11/1986 | Kagami | 209/534 X |
| 4,693,376 | 9/1987 | Marion et al. | 209/587 X |

(List continued on next page.)

FOREIGN PATENT DOCUMENTS

| | | | |
|---|---|---|---|
| 0097570 | 1/1984 | European Pat. Off. | |
| 0239337 | 9/1987 | European Pat. Off. | |
| 2685650 | 7/1993 | France | 209/603 |
| 2432032 | 1/1976 | Germany | |
| 148905 | 6/1981 | Germany | |
| 3221379 | 12/1983 | Germany | |
| 1209246 | 8/1989 | Japan | 271/263 |
| 2106081 | 4/1983 | United Kingdom | |

OTHER PUBLICATIONS

*Elektroniks*, vol. 19, No. 1, Jan. 1970.

Primary Examiner—William E. Terrell
Assistant Examiner—Tuan Nguyen
Attorney, Agent, or Firm—Burns, Doane, Swecker & Mathis

[57] ABSTRACT

An apparatus for verifying any of a plurality of predetermined compositions of multilayered units composed of stacked sheetlike parts passed in spaced succession by a checkpoint, including the steps of determining a first value according to a thickness of a first unit of a first predetermined composition; storing said first value as a reference value for said first predetermined composition; determining a second value according to a thickness of a successive unit intended to have said first predetermined composition; comparing said reference value with said second value; and rejecting said successive unit when said second value is outside a tolerance range around said reference value; wherein said first and second values are calculated from a plurality of measurements taken during at least one predetermined measuring interval along each of said first unit and said successive unit, respectively, at least one limit of said at least one measuring interval being related to the passage of a transverse edge of the respective unit such that said measurements are taken along a section of the respective unit having one end located a selected distance from said transverse edge where the measured thickness in the section is substantially uniform and representative of the composition of that unit.

7 Claims, 1 Drawing Sheet

U.S. PATENT DOCUMENTS

| | | | |
|---|---|---|---|
| 4,700,368 | 10/1987 | Munn et al. | 271/263 X |
| 4,863,037 | 9/1989 | Stevens et al. | 209/604 X |
| 4,966,354 | 10/1990 | Grunder | 271/263 X |
| 5,011,127 | 4/1991 | Hamilton et al. | 271/262 |
| 5,029,845 | 7/1991 | Simpson-Davis | 271/362 |
| 5,075,622 | 12/1991 | Konii et al. | 324/229 |
| 5,203,555 | 4/1993 | Cannaverde et al. | 271/263 |
| 5,265,733 | 11/1993 | Hoekstra et al. | 209/603 |

METHOD OF CHECKING THE COMPOSITION OF MULTILAYER UNITS COMPOSED OF SHEETLIKE PARTS AND APPARATUS FOR COMPOSING, AND CHECKING THE COMPOSITION OF, SUCH UNITS

The present application is a divisional of the application Ser. No. 07/849,828, filed on Mar. 11, 1992, now U.S. Pat. No. 5,265,733, which was a continuation of Ser. No. 07/482,851, filed on Nov. 22, 1990, now abandoned.

BACKGROUND OF THE INVENTION

1. Field of the Invention

The present invention generally relates to a method for checking (or verifying) the composition of multilayer units composed of sheetlike parts. The units are passed in interspaced succession by a checkpoint where a value varying with the thickness of the unit is determined. This value is compared with a reference value corresponding to the desired thickness of the unit. The unit is then accepted or rejected depending on the results of the comparison. The invention also relates to an apparatus for composing and checking the composition of such units.

2. State of the Art

Bulk mail distributions often require the automatic preparation of multilayer units that are composed of sheetlike parts. These units are typically checked to make sure that they contain the correct number of sheets before they are mailed. Conventional checking techniques use a microswitch which is manually set to the desired thickness for each unit. The units are then checked for that one desired thickness as they pass a checkpoint. Conventional checking methods may, therefore, help prevent a situation where one document clings to another document (as a result of static electricity, for example) and is mailed to the wrong person as part of the wrong unit. However, the incorrect composition of a unit may also be due to other factors such as a feed station that fails to supply the correct number of documents for any unit.

One limitation of such conventional checking techniques is that the reference value (and hence the microswitch) must be manually reset for the desired composition (or thickness) of each different type of unit. Since it becomes increasingly difficult to accurately detect discrepancies in the overall composition of a unit as it includes more parts, eventually a point is reached where manually resetting the microswitch becomes too difficult to be entrusted to unskilled personnel.

Furthermore, since microswitches change signals at only one given value, they are not suitable for mail processing systems that form consecutive units having different compositions. For example, conventional microswitch detection systems may be unsuitable for bulk mail processing systems using optically read indicators that allow different documents to be selectively added to consecutive envelopes.

German Patent Application 32 21 379 discloses a method and apparatus for detecting whether 0, 1, or more sheets pass a checkpoint. The apparatus in that publication is intended to ascertain whether a single sheet—no more and no less—is fed to a paper printing apparatus. The device uses electromagnetic coils to measure the displacement of a roller from a support. The roller is pushed up by the sheetlike parts as they pass between the support and the roller.

There are various reasons why devices such as the one described in German Application 32 21 379 are unsuitable for use with composite units having multiple sheetlike parts. For example, a composite unit (and in particular a unit that includes folded documents) may be thick enough to cause the roller to jump, or bounce, to a level above the upper surface of the unit upon initial contact with the edge of that unit. This bouncing can give rise to incorrect or inaccurate measuring results. Similar inaccuracies might also be caused by an uneven arrangement of the various component documents in a unit. Furthermore, some units may not have a consistent thickness; especially if the unit includes documents having different lengths or documents which are folded into unequal portions.

Conventional detection devices are usually limited to merely determining whether a document has, in fact, been added to a unit. Therefore, conventional techniques usually require a detection apparatus at each document feed station. Moreover, such conventional techniques require each composite unit to be periodically checked at various stages in the assembly process in order to verify that every document supplied to that unit remains with the unit.

SUMMARY OF THE INVENTION

It is an object of the present invention to improve the method described in the title by rendering it so accurate and flexible that composite units of varying predetermined compositions passing by a checkpoint in succession can be reliably checked without using any complicated procedures for resetting the apparatus. This goal may be achieved in accordance with the present invention if, for each unit of a given composition, the value varying with the thickness of the unit is stored and used as a reference value the next time a unit of that particular composition passes the checkpoint.

The value varying with thickness is determined for each unit from calculations performed on a measuring result obtained from measurements taken during a given time interval. The beginning or end of the time interval is related to the passing of one of the edges of the unit. The measurements are then made in an area along the length of that unit where the thickness can be checked without being affected by bouncing, uneven arrangement of the various component documents, or the documents being folded into unequal parts.

The accuracy of the present method may also be improved by taking measurements during a given interval and then calculating a measuring result from those measurements. This increased accuracy makes it possible to use the measuring result to automatically set the reference values for each different composition. A reference value can automatically be assigned to each different composition so that subsequent units of similar composition can be checked against the same reference value. The reference value can then be easily and rapidly adjusted when the checking process is started or when the composition of the next succeeding unit requires a different reference value. Consequently the method is eminently suitable for applications in mail processing systems where units of different compositions need to be reliably checked as they pass a single checkpoint.

A profile of the upper surface of the composite unit is determined during the measuring interval. This profile can then be used for obtaining a measuring result by performing calculations such as integration. However, the measuring result is preferably obtained by recording a plurality of measuring signals during the measuring interval. These signals are then averaged or summed in order to arrive at a measuring result which is compared with the reference value.

In order to ensure that irrelevant minor variations in the measuring signals do not cause units to be rejected, it is preferred that the measuring result be accepted if it falls within a certain tolerance range of the reference value. The limits of this tolerance range are generally set to a value which is smaller than the expected value of the thinnest component part of the units to be checked. The tolerance range is preferably about one-half the value of the thinnest component part for any unit.

The leading and trailing edge of each composite unit may be determined by treating the spaces between units as having zero thickness with a corresponding zero reference value. A deviation from the zero thickness value outside of the tolerance range is then used to detect the leading and/or trailing edge of a unit. Of course the zero reference value may always be readjusted and given a tolerance range which is different from the tolerance range associated with other measurements.

Each composite unit, depending on its component documents, may have a thickness that varies along the length of the unit. In order to ensure that a truly representative measuring area along the unit is selected, it is preferred that the entire length of the first unit of a given composition that passes the checkpoint be measured. A proper measuring interval, which is truly representative of the unit's composition, can then be determined for all units having that particular composition. The measuring interval will preferably commence relative to one of the edges of the unit. It can then be determined for all units having that particular composition, when a proper measuring interval, which is truly representative of the unit's composition, is to commence relative to one of the edges of the unit.

In mail processing systems which selectively add sheets to some units but not to others, the supply of documents to each unit is typically controlled by a stream of information. In accordance with a further embodiment of the present invention, this stream of information can be used advantageously, especially when the respective composite units vary in thickness. The reference value, against which the measured value of each unit is to be compared, may be determined from this control information so that a different reference value may be used for each anticipated unit composition.

If units of widely different and varying compositions are to be checked, it is possible that one or more compositions will not pass the checkpoint for a long period of time. During that time, the stored reference value may no longer be accurate due to changes in the process condition, for example. This problem can be solved in accordance with another embodiment of the present invention by arithmetically determining the reference value for a given composite unit based upon the reference values associated with a plurality of different compositions. For example, a new reference value for a composite unit having three sheets may be obtained by adding the reference value of a composite unit having one sheet to the reference value of another composite unit having two sheets.

In addition, the influence of each component on the reference value for a unit may be used to provide an indication as to what portion of the composite unit caused the rejection. Consequently, not only can each unit be checked for the desired composition, but also, the invention may provide an indication as to which document feed station supplied the wrong number of documents to a rejected unit. Appropriate measures can then be taken more promptly when any errors are observed.

Sensing a unit by contact allows a wide measuring range in comparison with non-contact measuring methods. The measuring interval may be a delayed following sensing of the leading edge of a unit in order to prevent inaccurate measurements due to the sensor bouncing over the leading edge of the unit. Consequently, the measured value in the present invention does not jump to a higher value beyond the actual thickness of the unit in the measuring interval.

The invention also relates to an apparatus for composing, and checking the composition of, multilayer units composed of sheetlike parts. The apparatus includes a conveyor track, a plurality of document feed stations arranged in spaced succession along the conveyor track, and at least one measuring unit for determining a value varying with the thickness of a unit as it passes along the conveyor track. The composition and number of sheets may vary from unit to unit. The feed stations may selectively add a document to each successive unit depending on the specific composition desired for that unit.

Conventional devices require a measuring unit to be positioned downstream of each feed station in order to check whether a document has, in fact, been added to a given unit by the corresponding feed station. For example, four feed stations in a conventional apparatus would require four measuring units. The present invention aims to simplify such conventional devices by utilizing a single measuring unit positioned after the last feed station. A calculating and control unit is then provided to effect the previously described methods. Consequently, only a single measuring unit is required in order to reliably check the composition of each passing unit, regardless of the number of feed stations.

The measuring unit preferably includes a sensor which is adapted to scan the conveyor track and the composite units transported on the track. The sensor is movably connected to a clip which is fixed to the conveyor track. Any displacement of the sensor relative to the clip causes a magnet in the sensor to move relative to an electromagnetic sensor, also referred to as an electromagnetic sensing means. The electromagnetic sensing means may move with the sensor or, alternatively, the electromagnetic sensing means may be connected to the fixed clip.

The sensor includes a roller which is adapted to scan the conveyor track. The roller is movably connected to the clip by two parallel leaf springs. A magnet is arranged on each leaf spring on opposite sides of the electromagnetic sensor. The electromagnetic sensor is then fixed to the clip between the two magnets.

DETAILED DESCRIPTION OF THE PREFERRED EMBODIMENTS

The checking method and apparatus according to the present invention will now be discussed in detail with reference to the accompanying drawing.

Figure 1:
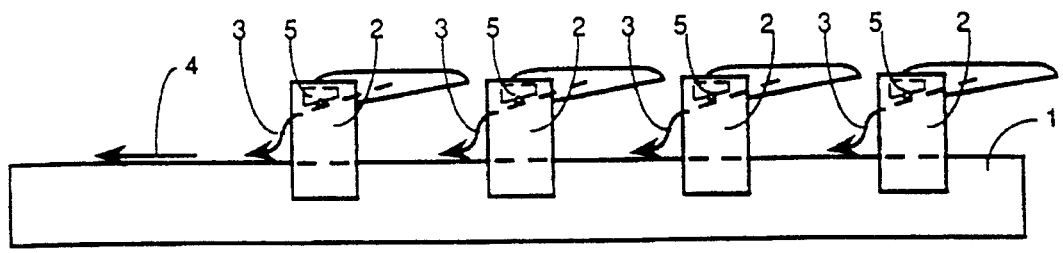
FIG. 1 schematically illustrates a side view of an apparatus for composing, and checking the composition of, multilayer units composed of sheetlike parts according to the prior art.

FIG. 1 illustrates a conventional apparatus having a conveyor track 1 with four feed stations 2. The feed stations are arranged to deposit a document 3 onto the upper surface of the conveyor track so as to form units of various compositions. Although only four feed stations are shown, any number of feed stations may be used. The conveyor track 1 may be connected at its supply end (the right end shown in FIG. 1) with one or more other document supplying apparatuses such as a printer, a collecting device, and/or a folding device. These additional devices may also be arranged between or downstream of the feed stations.

Arrow 4 indicates a complete unit that is ready to be taken off the conveyor. Each unit in FIG. 1 should be checked at each supply station in order to ensure that the proper number of documents from each station have been supplied to the unit. Each conventional feed station 2 therefore requires its own measuring unit 5 which is capable of establishing whether the correct number of documents are supplied by the measuring unit. However, even if the correct number of documents is supplied by each measuring unit, there is no guarantee that each document will end up with the correct unit. For example, a document may cling to the feed station 2 after having passed the measuring unit 5 and then become loose after a subsequent unit passes the feed station.

Figure 2:
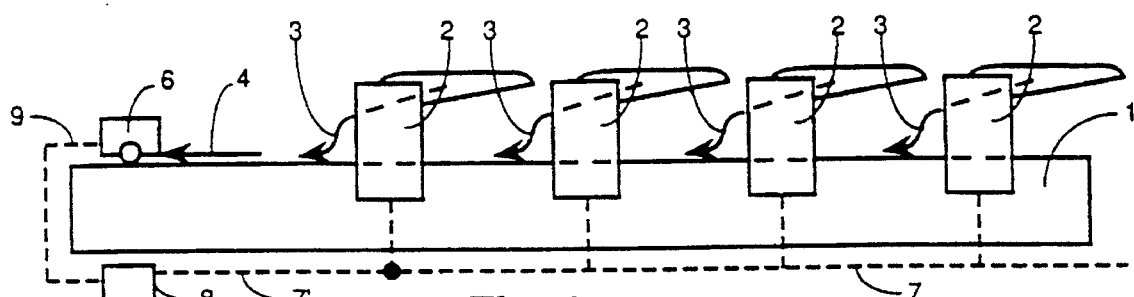
FIG. 2 schematically illustrates a side view of the present invention.

FIG. 2 illustrates an improved apparatus in accordance with the present invention. The apparatus includes a conveyor track 1 having feed stations 2 which add documents 3 so as to form composite units such as the one indicated by the arrow 4. In the present invention, however, only single measuring unit 6 is provided at the end of conveyor track 1. Consequently, the present invention does not require a separate measuring unit for each feed station. The measuring unit 6 scans the completed units to check whether they have the desired composition. Of course, it is also possible to arrange additional measuring units between the feed stations. Such additional measuring units can help ensure prompt discovery of improper feeding and the location of the improper feeding when it occurs.

Figure 3:
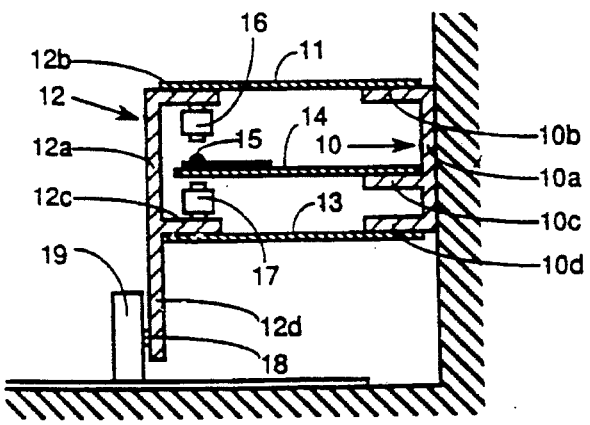
FIG. 3 illustrates a cross-sectional view of the measuring unit used in FIG. 2.

FIG. 3 illustrates a cross-section of one embodiment of a measuring unit, or measuring means, that can be used in the apparatus according to FIG. 2. Clip 10 is fixed relative to conveyor track 1. Clip 10 includes a base part 10a, spring supports 10b and 10d, and a plate support 10c. Sensor member 12 includes a base part 12a, spring support 12c, and a sensor support 12d which is coextensive with base part 12a.

One end of leaf spring 11 is attached to spring support 10b while the other end is attached to spring support 12b of sensor member 12. One end of leaf spring 13 is attached to spring support 12c while the other end is fixed to spring support 10d of clip 10. One end of plate 14 is attached to plate support 10c of clip 10. The other end of plate 14 includes an electromagnetic sensor 15 adapted to pass signals via communicating means (not shown) to a calculating unit (not shown). Magnets 16 and 17 are arranged on the spring supports above and below sensor 15. Shaft 18, carrying a rotary sensor roller 19, is then connected to the lower end of sensor support 12d.

Initially, roller 19 rests upon the upper surface of conveyor track 1. However, as soon as a composite unit resting on the upper surface of the conveyor track I reaches sensor roller 19, the roller will be pushed up and begin to roll along the upper surface of the composite unit. When roller 19 is pushed up, the leaf springs 11 and 13 bend so as to cause sensor member 12 to be displaced relative to clip 10. Consequently, the magnets 16 and 17 are also displaced relative to sensor 15 which causes a modification of the signal carried to calculating and control unit 8.

It will be clear that every vertical displacement of sensor roller 19 leads to a change in the signal generated by electromagnetic sensor 15. Such displacement will occur not only at the beginning and end of a composite unit, but also when the upper surface of a composite unit being scanned has an uneven surface.

Figure 4:
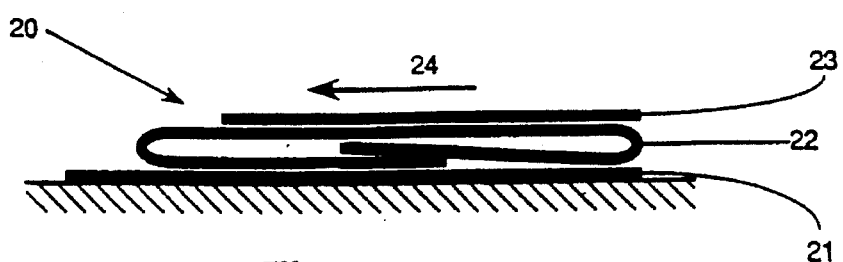
FIG. 4 illustrates a typical composite unit.

FIG. 4 illustrates one possible composition of a composite unit having an uneven upper surface. composite unit 20 includes an unfolded bottom sheet 21, a middle sheet 22 folded with overlapping end portions, and a top unfolded sheet 23 having a shorter length than sheet 21. Of course, FIG. 4 illustrates just one example of a multilayer unit having an uneven surface that sensor roller 19 may encounter.

Assuming that composite unit 20 moves in the direction of arrow 24 in FIG. 4, the roller 19 will first receive an upward displacement upon contacting the leading edge of bottom sheet 21. Then the leading folded edge of sheet 22 will cause a further upward displacement of roller 19. Since documents with folded edges tend to have a thickness which is more than twice the thickness of two unfolded documents, it is possible that sensor roller 19 will, after passing the folded edge, move slightly downward. The roller 19 will then be displaced upward again upon contacting the leading edge of top sheet 23.

Once the roller 19 has passed the leading edge of sheet 23, it has reached a position where the thickness is representative of the thickness of the unit. At that point, the displacement of roller 19 will equal the thickness of unfolded sheet 21 plus the thickness of unfolded sheet 23 plus twice the thickness of folded sheet 22. However, as roller 19 travels further along the length of the unit, it reaches an area where the two ends of sheet 22 overlap. After traversing this area with overlapping sheets, the roller once again returns to an area that is representative of the thickness of the unit. The roller may then sustain another upward displacement upon reaching the trailing fold of sheet 22. Finally, roller 19 disengages from unit 20 and rolls along the upper surface of conveyor track 1.

The difference between the vertical deviations of sensor roller 19 for representative portions and non-representative portions across composite unit 20 will be small if the composite unit has a simple construction. For example, every portion of a unit which is composed entirely of unfolded documents and documents of equal length will be representative of the thickness of the unit. Even for units with such a simple construction, however, the deviation of the roller may not be representative of the thickness of the unit when the roller is pushed up and jumps up from the leading edge of a unit.

Accordingly, the deviation of the roller at the leading edge of a unit may not be sufficiently accurate for checking the entire composition of the unit. In order for the required accuracy to be obtained, measuring may be carried out during a certain interval, the beginning or end of which is related to one of the edges of the passing unit. The interval is set in such a way that portions of the unit which are not representative of the thickness of the unit fall outside the interval.

The representative thickness of a unit may be determined through calculations made from measurements taken during the representative interval. The representative thickness may be determined so accurately in this manner that it can then be used as a reference value for units having a similar composition. Accordingly, the value calculated for the first time any unit of a given composition is sensed is stored. This stored value may then be used to automatically adjust the checking apparatus for other units of a similar composition. If units of varying composition are to be checked, each time a unit of a given composition is sensed for the first time, the measured value will be stored as a reference value. The corresponding reference value is then used to check any subsequently passing unit having the same composition. In this way, only one checking apparatus is required in order to check units of various different compositions since the reference value is adjusted automatically. Of course, the reference value would be updated only if control system 7 (or an operator) confirms that the sensed value is, in fact, for a unit having a new composition, rather than a unit of the old composition which is outside of an acceptable tolerance range.

The automatic setting of reference values can further be used to adjust the reference value for changing environmental conditions, such as humidity and temperature. This is accomplished by adding a measured value, which has been accepted after comparison with a reference value, to a memory containing similar previously stored values. A new adjusted reference value may then be calculated from several of these stored values. For example, the last five measured values for any one particular composition can be used to calculate a new reference value which can then be used for comparison with the next passing unit of a similar composition.

As previously noted, the interval in which the measurement is carried out must contain a representative thickness of the passing composite unit. In the discussion of the composite unit shown in FIG. 4, two areas were indicated as having a representative thickness for the illustrated unit. Those two intervals were between the fold and the overlapping ends on the trailing and leading edge of the unit. However, the optimum interval for taking measurements across the unit may be determined by first taking an entire profile of the unit. The optimum measuring interval can then be determined from that portion of the profile that has a uniform or consistent thickness.

The leading or trailing edge of the composite unit can be used to accurately determine the beginning or end of the measuring interval. Since the sensor roller rests on the conveyor track before and after each unit, that position of the roller can be used as a zero reference value. Of course, the zero reference value can also be adjusted for changing process conditions in the same way as discussed above for adjusting the reference value for the thickness of each composite unit.

The portion of the device which makes the calculations (the calculating unit) will need to know which reference value to compare against each composite unit. The calculating unit must therefore be fed with data concerning the desired composition of the composite unit in question. This data may be drawn from a stream of information coming from control system 7 which is schematically shown in FIG. 2. The control system 7 governs the feed stations and is connected to calculating and control unit 8 through a circuit 7'. Control unit 8 may also control measuring unit 6 via circuit 9.

The composite units are typically sent by mail and therefore can be processed by folding and/or inserting apparatuses. Although the foregoing description is concerned with checking the unit at the end of a mail assembly line, it is also possible to check the unit before or after it is inserted into an envelope.

FIGS. 2 and 3 show a measuring unit with one sensor roller. However, each measuring unit may comprise a plurality of rollers. For example, two rollers may be arranged next to each other in order to scan each unit along different lines. The measuring data from such dual rollers may be then be processed in the calculating unit as needed, for example, as with the processing of cross-folded material.

Those skilled in the art will readily be able to make many modifications to and variations of the present invention without departing from the scope of the present invention as defined by the claims.

What we claim is:

1. An apparatus for preparing and checking the composition of multilayer units, each unit having a predetermined required composition of sheetlike parts, comprising:

a conveyor track for transporting multilayer units in succession;

a plurality of feed stations for feeding documents to the conveyor track;

a control system for controlling the feed stations;

a single thickness measuring unit, arranged on the conveyor track downstream of said plurality of feed stations, for determining a thickness value of each unit passed by said measuring unit along the conveyor track;

a calculating and control unit for comparing each of said thickness values with a respective reference value for each unit composition; and a circuit, interconnecting the control system and the calculating and control unit, for passing data on the required compositions of units to be checked from the control system to the calculating and control unit;

wherein the calculating and control unit is programmed for determining said reference values on the basis of respective data representing said required compositions for each of said units to be checked.

2. An apparatus according to claim 1, wherein the thickness measuring unit includes a measuring sensor adapted to scan the conveyor track, said measuring sensor being movably connected to a clip which is fixedly attached to the conveyor track, said measuring sensor including at least one magnet and an electromagnetic sensor arranged so that a displacement of the measuring sensor relative to the clip results in a displacement of the at least one magnet relative to the electromagnetic sensor.

3. An apparatus according to claim 2, wherein the measuring sensor includes a roller adapted to scan the conveyor track and the movable connection with the clip includes two generally parallel leaf springs having magnets are connected thereto arranged on opposite sides of the electromagnetic sensor, said electromagnetic sensor being fixedly attached to the fixed clip.

4. An apparatus as claimed in claim 1, wherein said thickness measuring unit includes a plate having one end cantilevered over a fixed position on said conveyor track;

a sensor member for contacting a multilayered unit at said fixed position on said conveyor track;

means for sensing a distance between a free end of said plate and said sensor member.

5. An apparatus as claimed in claim 4, wherein said sensor member includes a leaf spring cantilevered over said fixed position on said conveyor track between said plate and said conveyor track;

a roller arranged on a free end of said leaf spring for making contact with the multilayer units on said conveyor track and urging a free end of said leaf spring toward said plate; and a magnet arranged near a free end of said leaf spring; and wherein said sensing means includes an electromagnetic sensor, arranged near a free end of said plate, for sensing a distance between said magnet and said electromagnetic sensor.

6. An apparatus for checking the composition of multilayer units composed of sheetlike parts, comprising:

a conveyor track;

a plurality of feed stations for feeding documents in succession along the conveyor track;

a control system for controlling the feed stations;

a single thickness measuring unit, arranged along the conveyor track downstream of said feed stations, for determining a thickness value of each unit passed by said measuring unit along the conveyor track, the thickness measuring unit including a measuring sensor adapted to scan the conveyor track, said measuring sensor being movably connected to a clip which is fixedly attached to the conveyor track, said measuring sensor including at least one magnet and an electromagnetic sensor arranged so that displacement of the measuring sensor relative to the clip results in a displacement of the at least one magnet relative to the electromagnetic sensor, the measuring sensor further including a roller adapted to scan the conveyor track and the movable connection with the clip includes two generally parallel leaf springs having magnets are connected thereto arranged on opposite sides of the electromagnetic sensor, said electromagnetic sensor being fixedly attached to the fixed clip;

a calculating and control unit for controlling the thickness measuring unit and comparing said thickness value with a reference value; and a circuit, interconnecting the control system and the calculating and control unit, for passing data on the required composition of a unit to be checked from the control system to the calculating and control unit;

wherein the calculating and control unit is programmed for determining said reference value on the basis of data representing a required composition for that unit.

7. An apparatus for checking the composition of multilayer units composed of sheetlike parts, comprising:

a conveyor track;

a plurality of feed stations for feeding documents in succession along the conveyor track;

a control system for controlling the feed stations;

a single thickness measuring unit, arranged along the conveyor track downstream of said feed stations, for determining a thickness value of each unit passed by said measuring unit along the conveyor track, said thickness measuring unit including a plate having one end cantilevered over a fixed position on said conveyor track, a sensor member for contacting a multilayered unit at said fixed position on said conveyor track, said sensor member including a leaf spring cantilevered over said fixed position on said conveyor track between said plate and said conveyor track, a roller arranged on a free end of said leaf spring for making contact with the multilayer units on said conveyor track and urging a free end of said leaf spring toward said plate, and a magnet arranged near a free end of said leaf spring, and sensing means including an electromagnetic sensor, arranged near a free end of said plate, for sensing a distance between said magnet and said electromagnetic sensor;

a calculating and control unit for controlling the thickness measuring unit and comparing said thickness value with a reference value; and a circuit, interconnecting the control system and the calculating and control unit, for passing data on the required composition of a unit to be checked from the control system to the calculating and control unit;

wherein the calculating and control unit is programmed for determining said reference value on the basis of data representing a required composition for that unit.

* * * * *